(12) United States Patent
Bouillon et al.

(10) Patent No.: US 10,487,737 B2
(45) Date of Patent: Nov. 26, 2019

(54) DE-ICING SPLITTER LIP FOR AXIAL TURBOMACHINE COMPRESSOR

(71) Applicant: Techspace Aero S.A., Herstal (Milmort) (BE)

(72) Inventors: David Bouillon, Woluwe-Saint-Lambert (BE); Ghislain Herbaut, Berloz (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 651 days.

(21) Appl. No.: 15/131,206

(22) Filed: Apr. 18, 2016

(65) Prior Publication Data

US 2016/0305322 A1 Oct. 20, 2016

(30) Foreign Application Priority Data

Apr. 20, 2015 (BE) .................................. 2015/5255

(51) Int. Cl.
*F02C 7/047* (2006.01)
*F02C 3/04* (2006.01)
*F01D 25/02* (2006.01)

(52) U.S. Cl.
CPC .............. *F02C 7/047* (2013.01); *F01D 25/02* (2013.01); *F02C 3/04* (2013.01); *F05D 2220/32* (2013.01); *F05D 2230/60* (2013.01); *F05D 2260/221* (2013.01); *F05D 2260/38* (2013.01); *Y02T 50/672* (2013.01); *Y02T 50/675* (2013.01)

(58) Field of Classification Search
CPC .................................. F02C 7/047; F01D 25/02
See application file for complete search history.

(56) References Cited

U.S. PATENT DOCUMENTS

| 6,870,139 | B2 * | 3/2005 | Petrenko | A63C 1/30 219/201 |
| 8,015,788 | B2 * | 9/2011 | Stephenson | F01D 5/046 415/114 |
| 8,366,047 | B2 * | 2/2013 | Euvino, Jr. | F01D 25/02 244/134 D |

OTHER PUBLICATIONS

Search Report dated Dec. 22, 2015 for BE 201505255.

* cited by examiner

*Primary Examiner* — Igor Kershteyn
*Assistant Examiner* — John S Hunter, Jr.
(74) *Attorney, Agent, or Firm* — James E. Walton

(57) ABSTRACT

The present application relates to a de-icing splitter lip for a low-pressure compressor of a turbofan aircraft engine. The splitter lip surrounds the primary flow and includes an annular splitter wall with a circular leading edge, an outer shroud connected to the splitter wall, and a heating device in an electric ribbon that de-ices the splitter lip. The splitter lip further includes an elastic element made of elastomer, holding the heating device on the inside of the splitter wall. The elastic element is compressed, pre-loaded, in the splitter lip. Thus, the elastic element exerts a force F clamping the heating device against the splitter wall and the outer shroud in order to improve thermal contact. The present application also provides a method for assembling a splitter lip.

11 Claims, 3 Drawing Sheets

US 10,487,737 B2

DE-ICING SPLITTER LIP FOR AXIAL TURBOMACHINE COMPRESSOR

This application claims priority under 35 U.S.C. § 119 to Belgium Patent Application No. 2015/5255, filed 20 Apr. 2015, titled "De-Icing Splitter Lip for Axial Turbomachine Compressor," which is incorporated herein by reference for all purposes.

BACKGROUND

1. Field of the Application

The present application relates to the field of turbomachine de-icing. More precisely, the present application deals with a splitter lip for an axial turbomachine. The present application also considers an axial turbomachine fitted with a de-icing splitter lip.

2. Description of Related Art

Turbofan engines have been developed to care for the environment. Care for the environment is in this case intended to mean limiting noise and reducing consumption. With a view to optimizing their thrust and performance while reducing noise, jet engines use multiple annular air flows. Generally, a turbomachine splits an incoming air flow into a primary flow and a secondary flow in the form of annular sleeves. The primary flow passes through the compressors, a combustion chamber and is then expanded in turbines. The secondary flow passes around the outside of the compressor, the combustion chamber and the turbine, and then joins the primary flow at the exit from the jet engine. The flows are split by a circular splitter lip placed upstream of the compressor; the shape of this lip limits the amount of air entering the compressor.

The air entering the turbomachine is still at ambient temperature at the splitter lip. Since these temperatures can drop to −50° C. at altitude, humidity can cause ice to form on the lip. In flight, this ice can grow and accumulate until it forms blocks on the upstream side of stator vanes of the compressor. These blocks can also alter the shape of the lip and influence the air flow entering the compressor, which can impair the performance of the latter.

As they develop, the blocks can become particularly large and then detach due to the vibrations of the turbomachine. The incoming flow can cause these blocks to be ingested by the compressor, with the concomitant risk of damage to the rotor blades. This ingestion is particularly harmful as it does not pass through the fan beforehand. In order to limit this ice formation, splitter lips are provided with a de-icing device.

EP 1942249 A2 discloses a splitter lip for an axial turbomachine provided with a fan. The splitter lip comprises a de-icing system with a network of pipes coupled to a hot source. The pipes are in contact with the splitter lip and are held there with the aid of supports. Silicone material is placed between the support and the pipes in order to obtain a shock-absorbing effect so as to isolate the pipes from vibrations. This means that thermal conduction between the lip and the pipes is not optimal, resulting in impaired de-icing.

Although great strides have been made in the area of turbomachine de-icing, many shortcomings remain.

DETAILED DESCRIPTION OF THE PREFERRED EMBODIMENT

Figure 1:
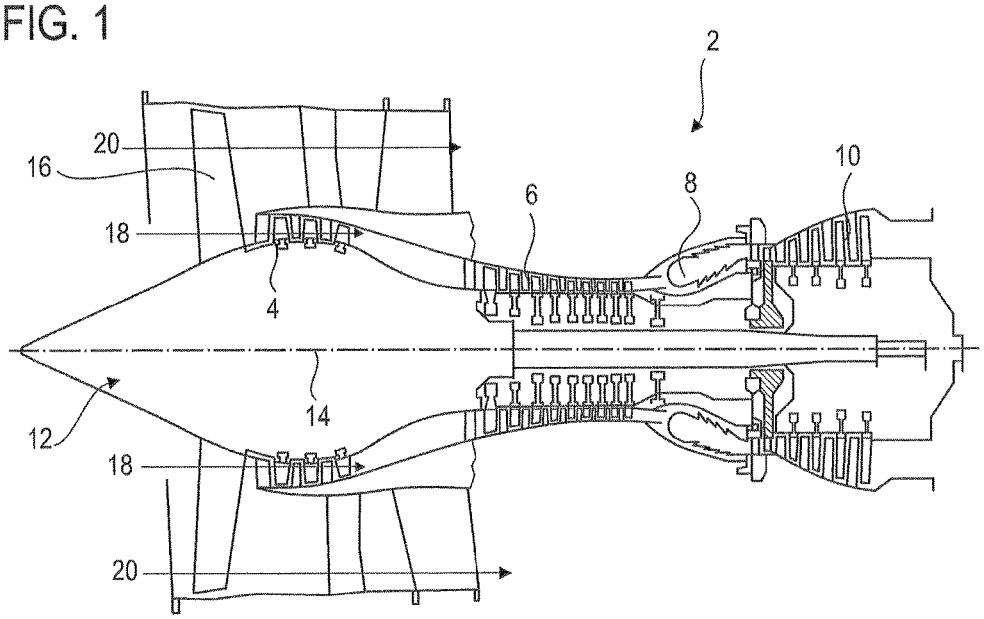
FIG. 1 shows an axial turbomachine according to the present application.

The present application aims to solve at least one of the problems presented by the prior art. More precisely, the present application has the object of improving the thermal exchange between the splitter wall and the heating pipes. The present application also has the object of improving the holding and the positioning of the heating pipes in the splitter lip.

The present application relates to a splitter lip for a turbomachine, in particular for a compressor of an axial turbomachine, the lip comprising: an annular splitter wall with a circular leading edge; heating device configured so as to be able to de-ice the splitter lip; at least one elastic element holding the heating device on the inside of the splitter wall; notable in that the at least one elastic element is pre-stressed in the splitter lip so as to exert a clamping force F on the heating device towards the splitter wall.

According to one advantageous embodiment of the present application, the at least one elastic element and the heating device are arranged along the leading edge so as to clamp the heating device along, possibly all along, the leading edge, preferably continuously.

According to one advantageous embodiment of the present application, the at least one elastic element is compressed axially and/or radially.

According to one advantageous embodiment of the present application, the at least one elastic element is circular; or the lip comprises multiple elastic elements in the form of arcs of a circle, said elastic elements being placed end-to-end so as to describe a circle.

According to one advantageous embodiment of the present application, the heating device describes a circle; or the heating device forms arcs of a circle placed end-to-end so as to describe a circle.

According to one advantageous embodiment of the present application, the splitter lip comprises an outer shroud surrounded by the splitter wall, preferably the splitter lip comprises an annular row of stator vanes supported by the outer shroud.

According to one advantageous embodiment of the present application, the heating device is in contact with the outer shroud, preferably the heating device surrounds the outer shroud and possibly the row of vanes.

According to one advantageous embodiment of the present application, the at least one elastic element is compressed radially between the splitter wall and the outer shroud so as to clamp the heating device radially against the outer shroud.

According to one advantageous embodiment of the present application, the outer shroud and the splitter wall form an annular channel that extends axially in the downstream direction, wherein the heating device is placed at the upstream end of said channel, and/or the heating device is in contact with the outer shroud and the splitter wall.

According to one advantageous embodiment of the present application, the outer shroud comprises a composite material, preferably having an organic matrix.

According to one advantageous embodiment of the present application, the heating device comprises a profiled body.

According to one advantageous embodiment of the present application, the heating device comprises a heating ribbon that fits against the splitter wall, and possibly the outer shroud, preferably the heating ribbon comprises a portion that is clamped against the splitter wall and a portion that is clamped against the outer shroud.

According to one advantageous embodiment of the present application, the at least one elastic element comprises an elastomer material and/or forms a block of elastic material.

According to one advantageous embodiment of the present application, the splitter lip comprises an annular cavity which is generally filled by the at least one elastic element and by the heating device, preferably the cavity is essentially filled by the at least one elastic element.

According to one advantageous embodiment of the present application, the splitter wall comprises an annular attachment flange, the at least one elastic element pressing axially against the annular flange, possibly the splitter lip comprises a wedge arranged between the at least one elastic element and the flange.

According to one advantageous embodiment of the present application, the splitter lip comprises thrust elements exerting a compressive force on the at least one elastic element so as to pre-load it, possibly the thrust elements are adjustable so as to adjust the compressive force.

According to one advantageous embodiment of the present application, the splitter lip comprises reversible locking means which hold the heating device in place, possibly the locking means are the thrust elements.

According to one advantageous embodiment of the present application, the heating device and/or the at least one elastic element can form a seal and/or a closure, possibly between the outer shroud and the splitter wall, and/or between themselves.

According to one advantageous embodiment of the present application, the splitter wall comprises a profile of revolution with a region of increased thickness in the upstream direction, preferably the leading edge is formed on said region of increased thickness.

According to one advantageous embodiment of the present application, the outer shroud comprises an annular hook for attaching to the splitter wall.

According to one advantageous embodiment of the present application, the splitter wall comprises an annular surface for receiving the heating device, the at least one elastic element clamping the heating device against the receiving surface; possibly the receiving surface is oriented axially downstream and/or radially inwards.

According to one advantageous embodiment of the present application, the heating device comprises an electric track, in particular with resistive electrical conductors.

According to one advantageous embodiment of the present application, the at least one elastic element is compressed against the heating device so as to clamp the heating device against the splitter wall and possibly against the outer shroud.

According to one advantageous embodiment of the present application, the at least one elastic element is compressed such that its length and/or its thickness is/are reduced by at least 0.10%, preferably by at least 0.50%, more preferably by at least 2.00% and possibly by at least 5.00%. According to one advantageous embodiment of the present application, the at least one elastic element is compressed by at least 1% of the axial length thereof in the splitter lip so as to exert a clamping force F on the heating device towards the splitter wall, wherein the clamping force ensures that the heating device seals the annular passage.

The present application also relates to a turbomachine comprising a de-icing splitter lip, notable in that the splitter lip is in accordance with the present application.

The present application also relates to a method for assembling a de-icing splitter lip for a turbomachine, in particular a splitter lip for a low-pressure compressor, the splitter lip comprising: an annular splitter wall with a circular leading edge; heating device configured so as to be able to de-ice the splitter lip; at least one elastic element holding the heating device on the inside of the splitter wall; notable in that, during assembly, the at least one elastic element is compressed such that it is then pre-loaded in order to exert a force F clamping the heating device against the splitter wall, possibly the splitter lip is in accordance with the present application.

According to one advantageous embodiment of the present application, during assembly, the heating device is placed in the splitter lip before the at least one elastic element.

According to one advantageous embodiment of the present application, during assembly, the at least one elastic element is introduced into the splitter lip then compressed and remains compressed in the assembled state of the splitter lip.

According to one advantageous embodiment of the present application, during assembly, the heating device and/or the at least one elastic element is/are introduced axially in the upstream direction.

According to one advantageous embodiment of the present application, during assembly, the elastic element exerts a force that opposes its introduction inside the de-icing wall.

Generally, the advantageous embodiments of each subject of the present application can equally be applied to the other subjects of the present application. As far as possible, each subject and each advantageous embodiment can be combined.

The present application makes it possible to clamp the heating device against the receiving surface of the splitter wall. The risk of there being an air pocket between the heating device and the wall is limited or eliminated, which improves thermal conduction. The present application affords the same advantage regarding the outer shroud.

The elastic element is arranged along and fits against the heating device such that it applies a distributed and even clamping force on the heating device. The latter are thus subjected to regular pressure and not to pressure peaks created by hard points, which might damage them. This means that they can be made more lightweight since there is less need for them to be robust.

The present application retains the capacity for de-icing the splitter lip in the event of ingestion and/or impact. Indeed, in the event of an impact that deforms the splitter wall, the elastic element continues to clamp the heating device. It also offers a capacity for absorbing the energy of the impact. The elastic element remains effective for large deformations, which increases the operational safety of the turbomachine.

The configuration of the present application allows the heating device to be mounted in that they are held essentially by the elastic element. The assembly is self-stable. This mode of attachment is reversible. In the event of damage, replacement is simplified. Since the heating device can be broken down into sectors, it is possible to replace just one portion thereof by removing just a single arc of elastic element.

In the following description, the terms inner or internal and outer or external refer to a position with respect to the axis of rotation of an axial turbomachine. The axial direction corresponds to the direction along the axis of rotation of the turbomachine.

FIG. 1 is a simplified illustration of an axial turbomachine. In this specific case, it is a turbofan engine. The engine 2 comprises a first compression stage, called the low-pressure compressor 4, and a second compression stage, called the high-pressure compressor 6, a combustion chamber 8 and one or more turbine stages 10. In operation, the mechanical power of the turbine 10 transmitted via the central shaft to the rotor 12 drives the two compressors 4 and 6, which bear multiple rows of rotor blades associated with rows of stator vanes. The rotation of the rotor about its axis of rotation 14 thus makes it possible to generate a flow of air and to progressively compress the latter up to the inlet into the combustion chamber 8. Gearing means can increase the speed of rotation transmitted to the compressors.

An inlet fan 16 is coupled to the rotor 12 and generates a flow of air which is split into a primary flow 18 passing through the various above-mentioned stages of the turbomachine and a secondary flow 20 passing through an annular duct (shown in part) along the machine in order to then join the primary flow at the exit from the turbine. The secondary flow can be accelerated so as to generate a thrust reaction. The primary 18 and secondary 20 flows are annular flows; they are ducted by the casing of the turbomachine. To that end, the casing has cylindrical walls or shrouds which can be internal and external.

Figure 2:
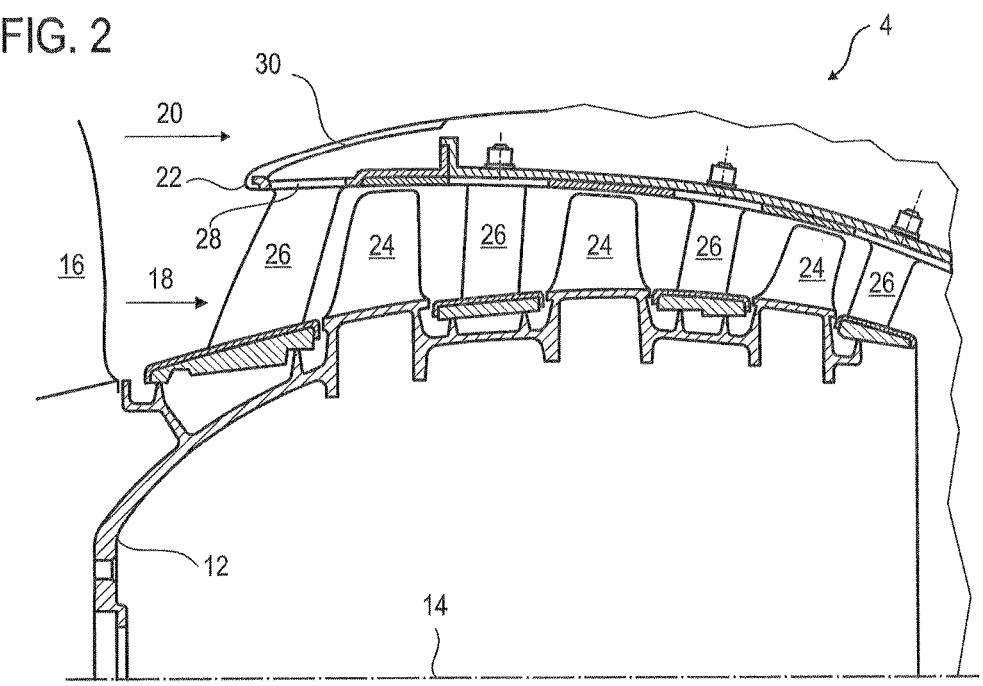
FIG. 2 is a diagram of a turbomachine compressor according to the present application.

FIG. 2 is a view in section of a compressor of an axial turbomachine such as that of FIG. 1. The compressor may be a low-pressure compressor 4. The figure shows a part of the fan 16 and the lip 22 for splitting the primary flow 18 and the secondary flow 20. The rotor 12 comprises multiple, in this case three, rows of rotor blades 24.

The low-pressure compressor 4 comprises multiple, in this case four, stators which each contain a row of stator vanes 26. The stators are associated with the fan 16 or with a row of rotor blades in order to redirect the flow of air such that the speed of the flow is converted into static pressure.

The splitter lip 22 bounds the inlet to the compressor 4 circumferentially and/or axially. It may comprise an outer shroud 28 and an outer annular splitter wall 30, both of which may be made using polymer materials such as organic matrix composite materials, in order to reduce weight. The stator vanes 26 extend essentially radially from the outer shroud 28 to which they are joined.

In order to avoid the formation of frost or of a layer of ice on the splitter lip 22, the latter is provided with or connected to a de-icing system. This makes it possible to heat up the splitter lip 22 in order that no ice forms or accumulates thereon; and/or in order to melt a layer of ice which might have accumulated there beforehand.

Figure 3:
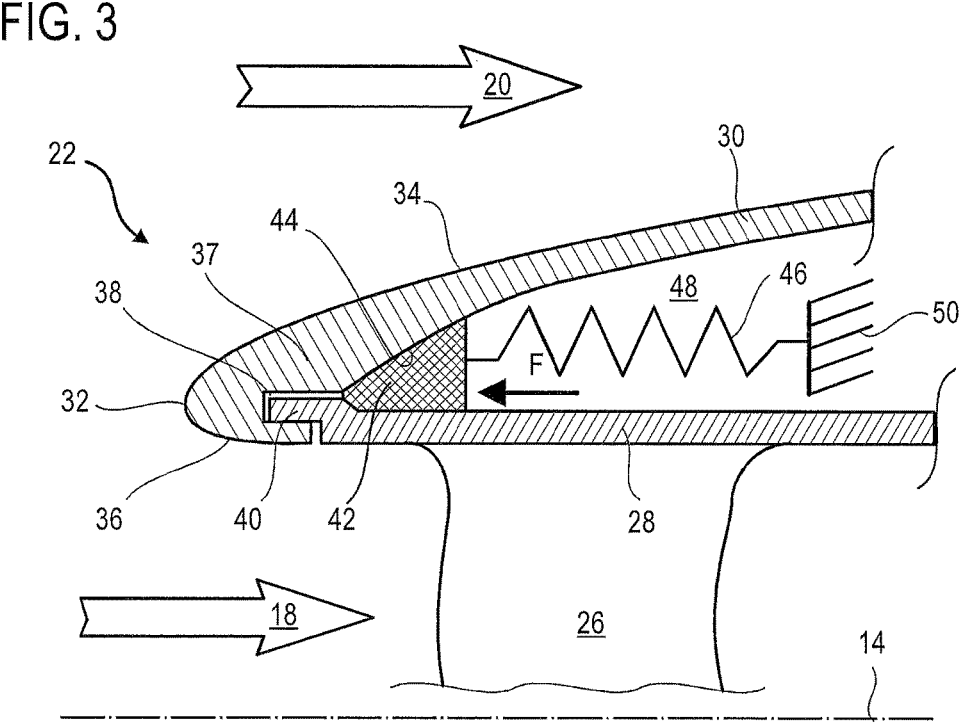
FIG. 3 shows a splitter lip according to a first embodiment of the present application.

FIG. 3 shows a splitter lip 22 according to the first embodiment of the present application. It serves to split the primary flow 18 and the secondary flow 20; the axis of rotation 14 is provided by way of reference.

The splitter wall 30 is annular with a profile of revolution and serves to divide at least one annular flow from the flow entering the turbomachine. In this case, it separates the primary flow 18 and the secondary flow 20 by means of its circular leading edge 32. The splitter wall 30 has an outer splitter surface 34 in contact with the secondary flow 20 and an inner splitter surface 36 in contact with the primary flow 18. These splitter surfaces meet at the leading edge 32.

The splitter wall 30 has an upstream thickened portion 37 on which the leading edge 32 is formed. It also has an annular attachment slot 38 which serves for attaching the outer shroud 28. Moreover, the latter has an upstream annular hook 40 which is introduced into the attachment slot 38. The thickened portion 37 improves the strength of the leading edge 32 in the event of ingestion; it limits the deformation of the latter. It also maintains the attachment of the outer shroud 28 in the event of an impact. At the leading edge 32, the radius R of the profile of revolution of the splitter surfaces is smaller than 100 mm, preferably smaller than 30 mm, more preferably smaller than or equal to 5.00 mm.

The system for de-icing the splitter lip 22 comprises a heating device 42. The heating device 42 may be a body of heated material, this being achieved by circulating a heat-transporting fluid or by means of an electric supply. They may be pipes of an oil circulation circuit of the turbomachine. The heating device 42 may fit tightly against a corresponding surface formed on the splitter wall, such as a receiving surface 44. The heating device 42 may obscure and/or block off the passage via the attachment slot 38, optionally in a sealed manner. They may also fit tightly against an outer surface of the outer shroud 28, and possibly its annular step shape. They may be placed axially at the leading edges of the stator vanes 26 of a row borne by the shroud 28.

In order to maintain thermal contact between the heating device 42 and the splitter wall 30, the splitter lip 22 comprises at least one elastic element 46 which is pre-loaded, in particular by compression. The elastic element 46 is pre-loaded in order to clamp the heating device 42 against the splitter wall 30. The elastic element 46 is compressed axially such that it pushes the heating device 42 axially in the upstream direction in an annular channel 48 created between the outer shroud 28 and the splitter wall 30.

The elastic element 46 may be a spring, for example circular and/or metallic. It may run all around the splitter lip 22. It may be a ring having axial waves. Alternatively or in addition, the splitter lip 22 may comprise a series of elastic elements 46 forming arcs of a circle. These are placed end-to-end so as to describe a circle. Each elastic element 46 bears against any support 50, for example formed on the splitter wall 30 and/or the outer shroud 28 and/or on any other stop arranged downstream.

Figure 4:
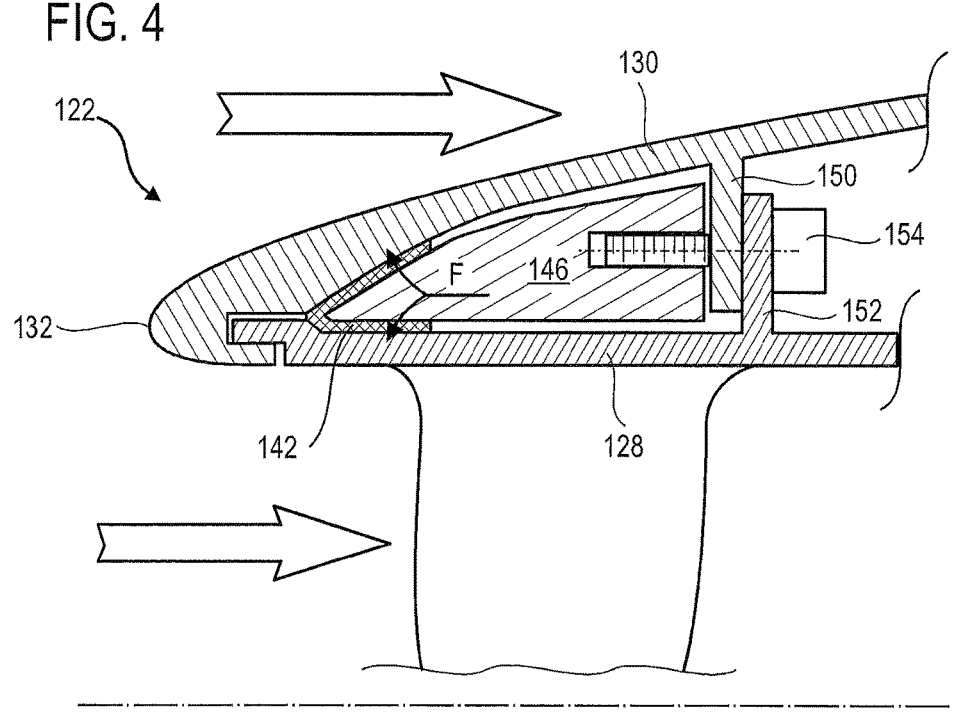
FIG. 4 shows a splitter lip according to a second embodiment of the present application.

FIG. 4 shows a splitter lip 122 according to the second embodiment of the present application. This FIG. 4 repeats the numbering of the preceding figures for identical or similar elements, this numbering being however increased by 100. Specific numbers are used for the elements specific to this embodiment. The splitter wall 130 and the outer shroud 128 may be generally identical to the first embodiment, comprising especially a circular leading edge 132.

The heating device 142 may be a heating ribbon, in the manner of a heating blanket, which is clamped inside the splitter lip 122 between the splitter wall 130 and the outer shroud 128. The heating device 142 may comprise a heating electric circuit with interlaced resistive tracks.

The de-icing system comprises an elastic element 146 forming a block, possibly a solid block, of elastic material. It may comprise an elastomer material. The elastic element 146 fits tightly against the corner shape formed by the heating device 142. It is pre-loaded, compressed. It exerts a holding force F and a clamping pressure. In this configuration, it radially separates two annular portions of the heating device 142, one being clamped against the splitter wall 130, the other against the outer surface of the outer shroud 128. The elastic element 146 is thus compressed and pre-loaded radially.

The elastic element 146 may press against the inner attachment flange 150 of the splitter wall 130 and/or against the outer attachment flange 152 of the outer shroud 128. These may possibly be annular and/or attached to one another. The splitter lip 122 may comprise thrust elements 154 which engage with the elastic element 146 so as to exert an axial pre-loading force thereon. These thrust elements 154 may be adjustable, progressive and reversible. They may serve for attaching the flanges (150; 152) in addition to locking the elastic element 146 in position.

During assembly of the splitter lip 122, the outer shroud 128 and the heating device 142 are put in place. Then, the elastic element 146 is introduced so as to cover the heating device 142. It is then compressed axially so as to clamp the heating device 142 against the wall 130 and the shroud 128. Its upstream end is then squeezed radially. It is notable that the assembly described above may be created independently of the presence of the outer shroud.

Figure 5:
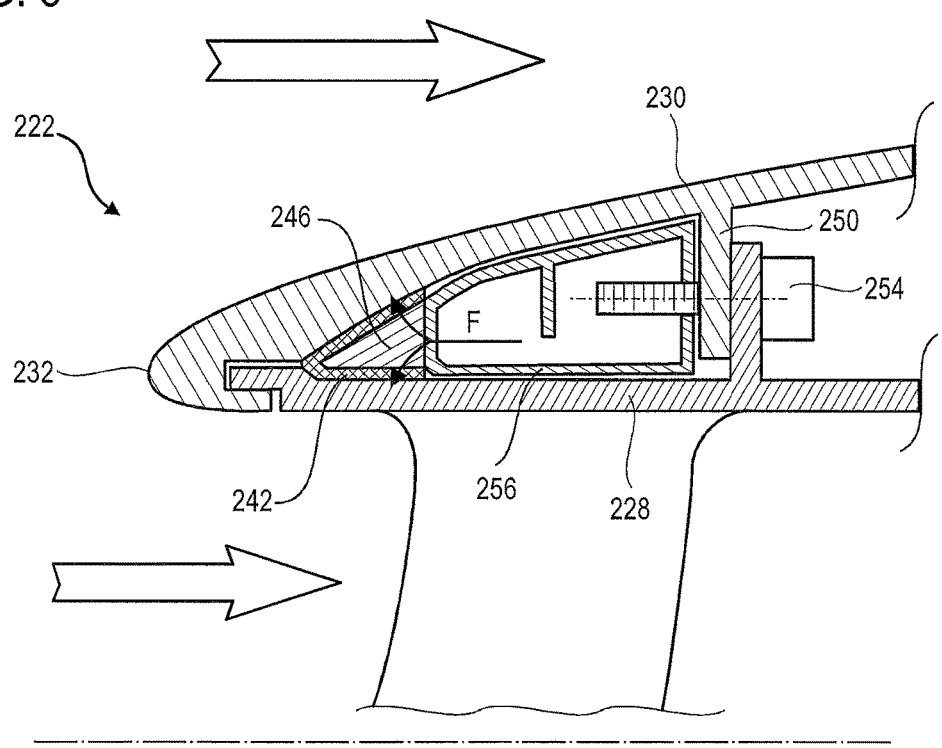
FIG. 5 shows a splitter lip according to a third embodiment of the present application.

FIG. 5 shows a splitter lip 222 according to the third embodiment of the present application. This FIG. 5 repeats the numbering of the preceding figures for identical or similar elements, this numbering being however increased by 200. Specific numbers are used for the elements specific to this embodiment. The splitter wall 230 and the outer shroud may be generally identical to the preceding embodiments, comprising especially a circular leading edge 232.

The heating device 242 may be identical to those described for FIG. 4. The elastic element 246 forms a strip inserted into the heating device 242. The splitter lip 222 comprises a wedge 256 positioned against the elastic element 246 and a downstream support, in this case the flange 250 of the splitter wall 230. The wedge 256 forms an annular spacer which provides a closer bearing surface. The thrust elements 254 may engage with the wedge 256 and remain remote from the elastic element 246. This lightens the lip 222.

During assembly of the splitter lip 222, the elastic element 246 is placed on the inside of the heating device 242. Then, the wedge 256 may be clamped against the elastic element 246 in order to compress the latter such that it exerts a clamping force F against the heating device. These then fit tightly against the splitter wall 230 or any other portion which they can de-ice. Then, the thrust elements 254 may be adjusted in order to modulate the compression of the elastic element 246, and thus the effect of clamping the heating device 242 on the splitter wall 230.

We claim:

1. A splitter lip for a turbomachine, the splitter lip comprising:
    an annular splitter wall with a circular leading edge and an inner attachment flange;
    a heating ribbon arranged against the annular splitter wall and configured to de-ice the splitter lip;
    at least one elastic element made as a block of elastomeric material and holding the heating ribbon on the inside of the annular splitter wall; and
    at least one adjustable thrust element attached to the inner attachment flange and applying an adjustable prestress onto the at least one elastic element;
    wherein the at least one elastic element has an upstream arcuate shape and the heating ribbon has a V-shape cross-section surrounding at least partially the upstream arcuate shape so that the heating ribbon axially overlaps the at least one elastic element inwardly and outwardly; and
    wherein the at least one elastic element exerts a clamping force F on the heating ribbon towards the annular splitter wall.

2. The splitter lip of claim 1, wherein the at least one elastic element and the heating ribbon are arranged along the leading edge so as to clamp the heating ribbon along the leading edge.

3. The splitter lip of claim 1, wherein the at least one elastic element is compressed axially or radially or any combination thereof.

4. The splitter lip of claim 1, further comprising:
    an annular row of stator vanes inside the annular splitter wall.

5. The splitter lip of claim 1, further comprising:
    an outer shroud surrounded by the annular splitter wall;
    wherein the outer shroud comprises a flange attached by the at least one adjustable thrust element to the inner attachment flange.

6. The splitter lip of claim 5, wherein the heating ribbon is in contact with the outer shroud.

7. The splitter lip of claim 5, wherein the at least one elastic element is compressed radially between the annular splitter wall and the outer shroud so as to clamp the heating ribbon radially against the outer shroud.

8. The splitter lip of claim 5, wherein the outer shroud and the annular splitter wall form an annular channel that extends axially in the downstream direction, and wherein the heating ribbon is placed at the upstream end of the annular channel.

9. The splitter lip of claim 5, wherein the outer shroud comprises:
    a composite material having an organic matrix.

10. The splitter lip of claim 1, further comprising:
    an annular cavity filled by the at least one elastic element and by the heating ribbon.

11. A splitter lip for a turbomachine, the splitter lip comprising:
    an annular splitter wall with a circular leading edge and an inner attachment flange;
    a heating ribbon arranged against the annular splitter wall and configured to de-ice the splitter lip;
    at least one elastic element made as a block of elastomeric material and holding the heating ribbon on the inside of the annular splitter wall;
    at least one adjustable thrust element attached to the inner attachment flange and applying an adjustable prestress onto the at least one elastic element; and
    a wedge interposed between the at least one adjustable thrust element and the at least one elastic element;
    wherein the at least one elastic element has an upstream arcuate shape and the heating ribbon has a V-shape cross-section so that the ribbon axially overlaps entirely the at least one elastic element inwardly and outwardly; and
    wherein the at least one elastic element exerts a clamping force F on the heating ribbon towards the annular splitter wall.

* * * * *